(12) United States Patent
Lorenz

(10) Patent No.: US 7,213,486 B2
(45) Date of Patent: May 8, 2007

(54) VEHICLE STEERING WHEEL

(75) Inventor: Christian Lorenz, Leidersbach (DE)

(73) Assignee: TRW Automotive Safety Systems GmbH & Co, KG, Aschaffenburg (DE)

( * ) Notice: Subject to any disclaimer, the term of this patent is extended or adjusted under 35 U.S.C. 154(b) by 0 days.

(21) Appl. No.: 09/963,909

(22) Filed: Sep. 26, 2001

(65) Prior Publication Data

US 2002/0035889 A1 Mar. 28, 2002

(30) Foreign Application Priority Data

Sep. 26, 2000 (DE) ............... 200 16 637 U

(51) Int. Cl.
*B62D 1/04* (2006.01)
(52) U.S. Cl. ........................ 74/552
(58) Field of Classification Search ............ 74/552, 74/558
See application file for complete search history.

(56) References Cited

U.S. PATENT DOCUMENTS

| | | | |
|---|---|---|---|
| 2,128,069 A | 8/1938 | Ashby | |
| 4,468,978 A * | 9/1984 | Takahara et al. | 74/552 |
| 4,712,446 A * | 12/1987 | Kamata et al. | 74/552 |
| 4,821,598 A * | 4/1989 | Yamazawa et al. | 74/552 |
| 5,024,464 A * | 6/1991 | Kawaguchi et al. | 74/552 |
| 5,508,482 A * | 4/1996 | Martin et al. | 200/61.55 |
| 5,819,596 A * | 10/1998 | De Filippo | 74/552 |
| 5,868,041 A | 2/1999 | Suzuki | |
| 6,139,051 A * | 10/2000 | Fujita | 280/731 |
| 6,282,982 B1 * | 9/2001 | Testa | 74/558 |
| 6,354,622 B1 * | 3/2002 | Ulbrich et al. | 74/552 |
| 6,443,030 B1 * | 9/2002 | Schuler | 74/552 |
| 6,494,114 B1 * | 12/2002 | Schuler | 74/558 |
| 6,651,526 B1 * | 11/2003 | Imaizumi et al. | 74/552 |

FOREIGN PATENT DOCUMENTS

| | | | | |
|---|---|---|---|---|
| DE | 1209894 | | 1/1966 | |
| DE | 2013795 B2 | | 10/1971 | |
| DE | 19908916 A1 | | 9/2000 | |
| FR | 850310 | | 12/1939 | |
| JP | 56-099858 | * | 8/1981 | 74/552 |
| JP | 01-229763 | * | 9/1989 | 74/552 |
| JP | 09226602 | | 9/1997 | |

* cited by examiner

*Primary Examiner*—Chong H. Kim
(74) *Attorney, Agent, or Firm*—Tarolli, Sundheim, Covell & Tummino LLP

(57) ABSTRACT

The invention relates to a vehicle steering wheel comprising a hub, a steering wheel rim, and at least one spoke having at least one spoke section. An vibration-decoupling means is provided on the spoke which acts in all directions and at least largely isolates the steering wheel rim in terms of vibrations from the at least one section of the spoke.

14 Claims, 4 Drawing Sheets

VEHICLE STEERING WHEEL

TECHNICAL FIELD

The invention relates to a vehicle steering wheel.

BACKGROUND OF THE INVENTION

During driving, vibrations of the steering wheel can occur, which makes long journeys exhausting for the driver and impairs the steering sensation. Therefore, endeavors are being made to dampen the steering wheel with respect to the steering shaft or, for example, to fasten the gas bag module in an oscillating manner in the steering wheel hub.

From DE 20 13 795 B2, for example, there is known a steering wheel which has a steering wheel hub, a steering wheel rim and two spokes consisting of spoke sections. Ball joints including damping elements are each provided between the spoke sections themselves, as well as at the transition points of the spoke to the steering wheel rim and to the steering wheel hub, respectively. The spoke structure disclosed here must have a specific rigidity, so that one can not start out from an isolation of vibrations in a radial and/or circumferential direction. The spoke structure shown in this reference rather aims to provide for a defined resilience of the steering wheel rim in the direction of the steering axis upon impact of a vehicle driver.

BRIEF SUMMARY OF THE INVENTION

The invention provides a vehicle steering wheel which with a simple construction offers a high degree of driving comfort owing to a small tendency to vibration. This is achieved in a vehicle steering wheel which comprises a hub, a steering wheel rim, and at least one spoke having at least one spoke section. An vibration-decoupling means is provided on the spoke which acts in all directions and at least largely isolates the steering wheel rim in terms of vibrations in all directions from the at least one section of the spoke. In the vehicle steering wheel proposed, there is provided an vibration-decoupling means between the steering wheel hub and the steering wheel rim, i.e. either inside the spoke or at the transition point of the spoke to the steering wheel rim, so that the steering wheel rim vibrates at least less than in steering wheels known hitherto.

The vibration-decoupling means is formed by an elastic bearing, as provided by the preferred embodiment, the bearing being, for example, a composite bearing. It consists of several parts, some of which are so elastic that they do not transfer vibrations, which occur for example in the region of the steering wheel hub or the steering shaft, to the steering wheel rim. An immediate contact between adjacent rigid parts of the steering wheel in the region of the vibration-decoupling means is avoided as the forces in all directions are transferred via the elastic bearing.

The spoke and/or the steering wheel rim can have a foam casing which is part of the bearing, so that the bearing can be constructed at a favorable cost and is produced at least partially during the process of encasing with foam.

An embodiment of the invention makes provision that the bearing has a pin and a receiving shell (e.g. a bush) for the pin, between which an elastic equalizing element is arranged. The steering wheel rim preferably has, as a supplement to this, a skeleton ring, the pin or the receiving shell being fastened to the skeleton ring and the spoke having the respective counterpart, i.e. the receiving shell or the pin.

In order to bring the pin into the receiving shell on installation, for example the spoke is constructed to be so flexible that on installation the pin can engage axially into the mounting bush.

Another possibility of connection of the parts separated from each other by the vibration-decoupling means consists in dividing the spoke into spoke sections which overlap to create a fastening flange. For example, the vibration-decoupling means can be provided in the region of the fastening flange. Furthermore, the spoke sections can also make possible the introduction of the pin into the receiving shell, because usually the steering wheel rim is undivided, so that a radial joining of radial inner sections of the steering wheel into radially outer sections is only possible with increased structural expenditure.

A further embodiment makes provision that the spoke is divided into separate spoke sections which are connected with each other by a bearing surrounding the spoke sections and defines said vibration-decoupling means. The bearing surrounds the spoke sections like a sleeve and arrests them against each other such that on the one hand the steering forces are in fact transferred, but on the other hand an isolation of vibrations is achieved in a defined frequency range.

The connecting of the spoke with the steering wheel rim, which is as far as possible undivided, can take place for example in that the steering wheel rim is equipped with a skeleton ring having radially inwardly protruding projections of sheet metal which projections are bent such that they engage an end of the spoke facing the skeleton ring. This type of fastening is very simple and cheap to produce.

DETAILED DESCRIPTION OF THE PREFERRED EMBODIMENTS

Figure 1:
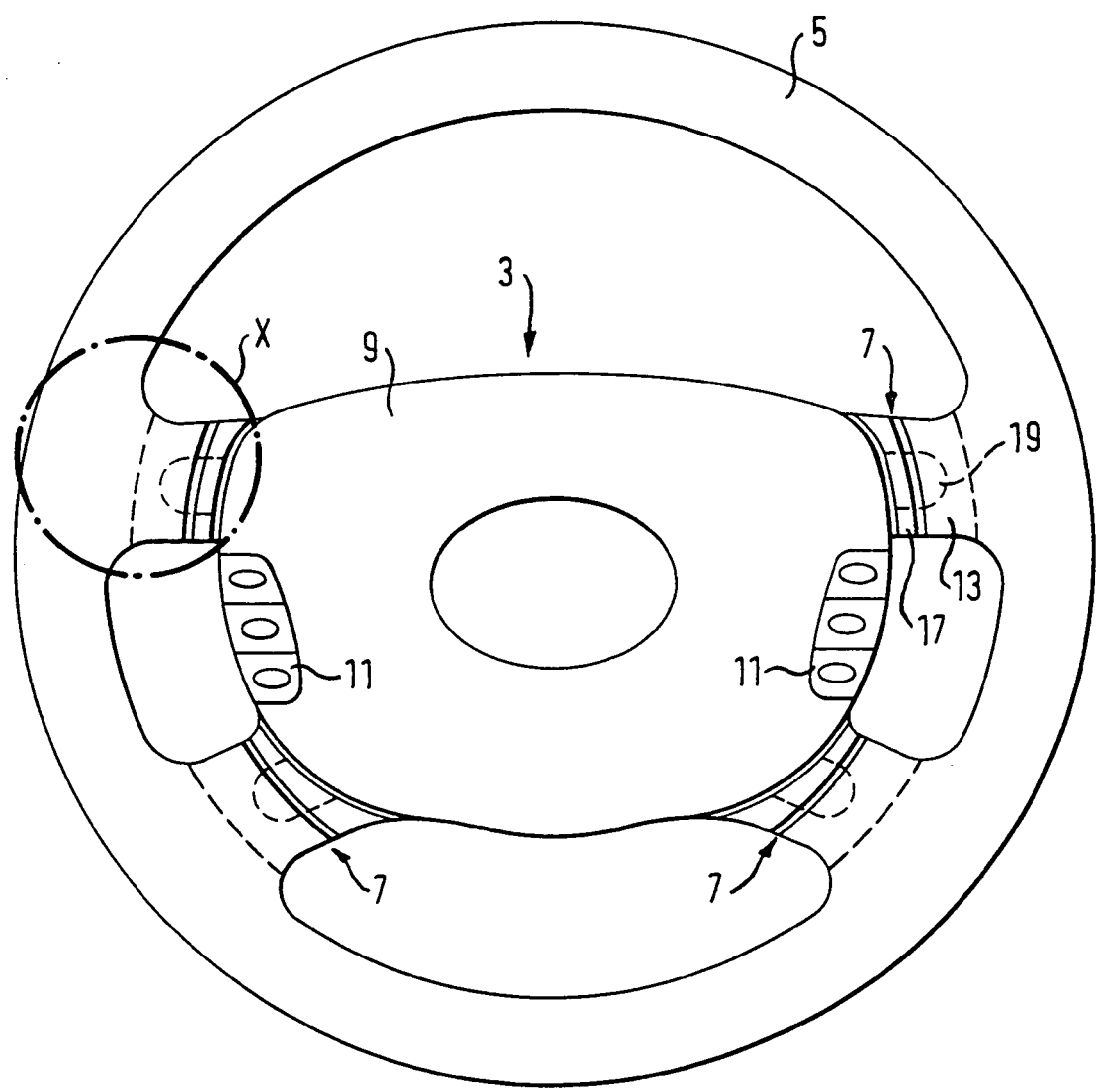
FIG. 1 shows a top view onto an embodiment of the steering wheel according to the invention.
Figure 2:
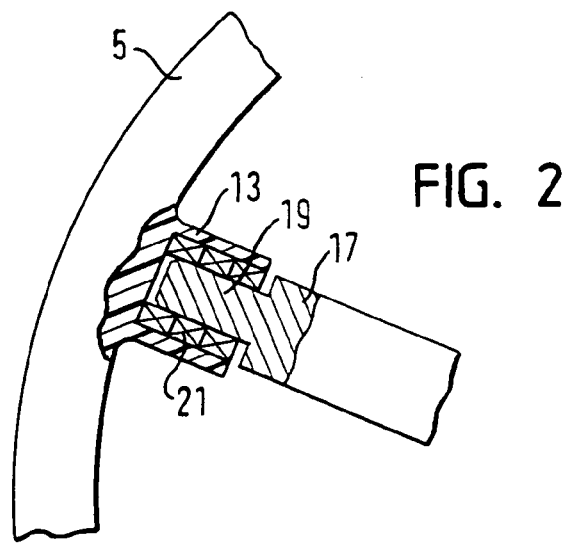
FIG. 2 shows an enlarged view of the region, designated by X in FIG. 1, partially in section.

In FIG. 1 a vehicle steering wheel is illustrated, which has a hub 3, a steering wheel rim 5 and four spokes 7. A horn switch area is designated by 9 and multifunction switches are designated by 11. Each spoke 7 is divided into an outer and a radially inner spoke section 13 and 17, respectively, in order to largely isolate the steering wheel rim 5 relative to the hub 3 with regard to vibrations. For this, in each spoke 7 an vibration-decoupling means is provided in the region of the transition point of the spoke sections 13, 17, which can be better seen in FIG. 2. The inner spoke section 17 has a pin 19, which is inserted into a composite bearing 21, which sits in an opening in the outer spoke section 13. The composite bearing 21 is composed of several elastic rings which achieve an isolation of vibrations of the steering wheel rim 5 with outer spoke section 13 fastened thereto from the inner spoke section 17 together with hub 3. The vibration-decoupling means acts in all directions (which is also the case in all further embodiments explained hereinafter), inter alia in the radial, axial and circumferential directions.

The composite bearing 21 forms an elastic equalizing element and the outer spoke section 13 forms a receiving shell for the pin 19 and the bearing 21.

Figure 3:
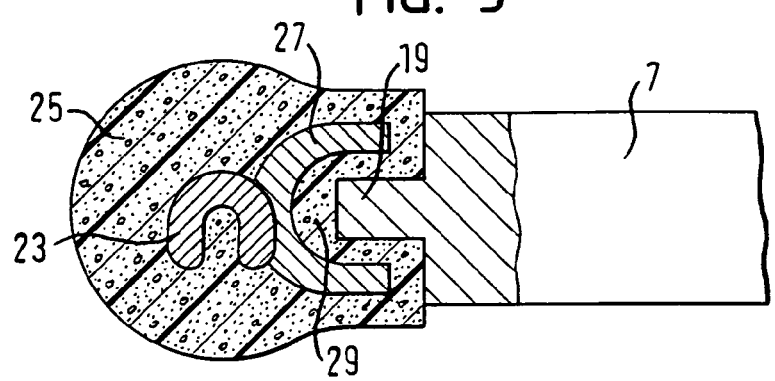
FIG. 3 shows a sectional view in the region of the transition point of the spoke to the steering wheel rim according to a second embodiment.

FIG. 3 shows the interior of the steering wheel rim, in which a skeleton ring 23 is provided, which is surrounded by a PU foam casing 25. In the region of the transition point to the spokes 7, the foam casing of which spokes being not illustrated explicitly, a receiving shell 27 is fastened to the skeleton ring 23, e.g. by welding; however, it can also be cast on. The receiving shell 27 is also encased in foam, the foam casing 25 also being provided in the interior 29 of the shell 27. In this region, the foam casing replaces the composite bearing 21 in FIG. 2 and forms the elastic equalizing element into which the pin 19 of the spoke 7 projects. The isolation of vibrations is consequently formed in this embodiment by the receiving shell 27, the PU foam casing 25 in the region of the interior 29 of the receiving shell 27 and by the bearing pin 19. The isolation takes place here between the steering wheel rim 5 and the entire spoke 7.

Figure 4:
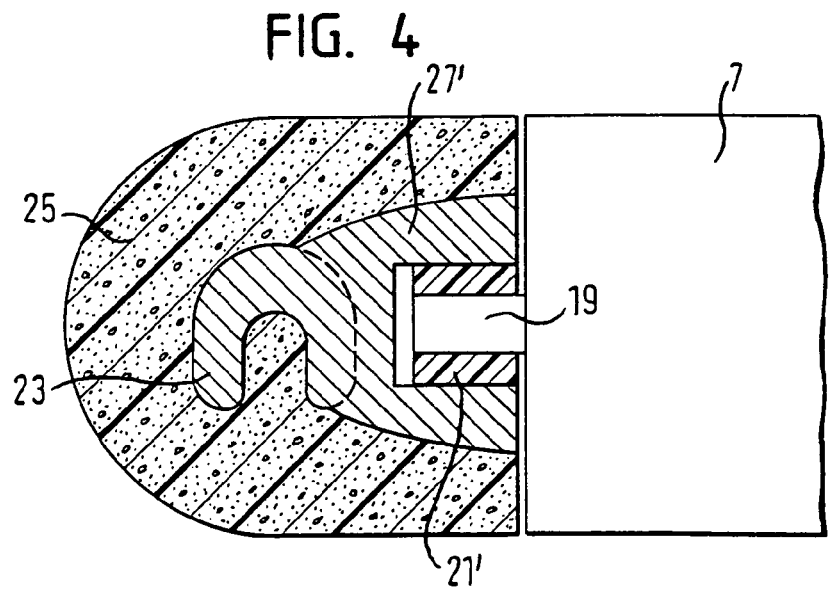
FIG. 4 shows a sectional view in the region of the transition point of the spoke to the steering wheel rim according to a third embodiment.

In the embodiment according to FIG. 4, the bearing shell 27' is cast on to the skeleton ring 23. The elastic equalizing element in the interior of the receiving shell 27' is formed by an inserted elastic bush 21', into which the pin 19 projects. In the embodiment according to FIG. 4, a subdivision of the spoke 7 is no longer to be seen from the exterior; rather, the vibration-decoupling means is arranged at the transition point of the spoke to the steering wheel rim, so that only the steering wheel rim is isolated in terms of vibrations.

Figure 5:
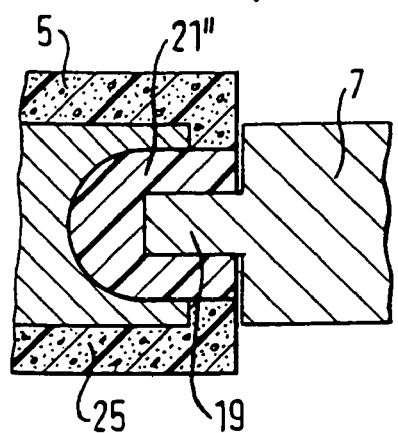
FIG. 5 shows a sectional view in the region of the transition point of the spoke to the steering wheel rim according to a fourth embodiment.

In the embodiment according to FIG. 5, a cup-shaped bush 21" made by injection-molding is inserted into the steering wheel rim 5, in order to achieve the isolation of vibrations.

Figure 6:
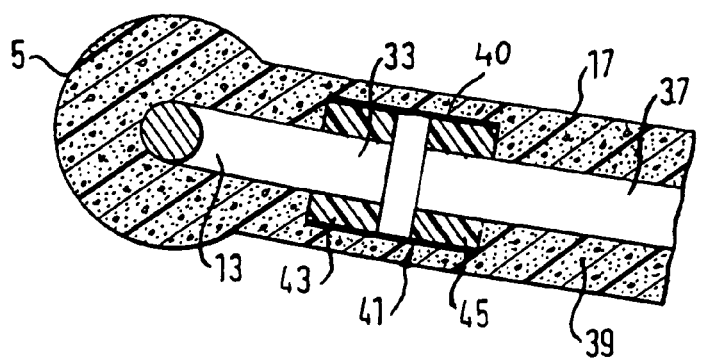
FIG. 6 shows a sectional view in the region of the transition point of the spoke to the steering wheel rim according to a fifth embodiment.

In the embodiment according to FIG. 6, each spoke 7 is divided into two spoke sections 13, 17 which have already been explained, the spoke skeleton also consisting of two sections 33, 37, which are encased in foam. The foam casing is designated by 39. The skeleton sections 33, 37 are surrounded by an elastic bearing 41, consisting a metal sleeve 40 and ring-shaped elastical bearing sections 43, 45 arranged in the sleeve 40, in order to achieve a connection of the spoke sections 13, 17 with regard to forces with, at the same time, an isolation of vibrations.

As the spokes are usually connected in one piece with the hub, steps must be taken to be able to insert the pins 19 into the corresponding bearings.

Figure 7:
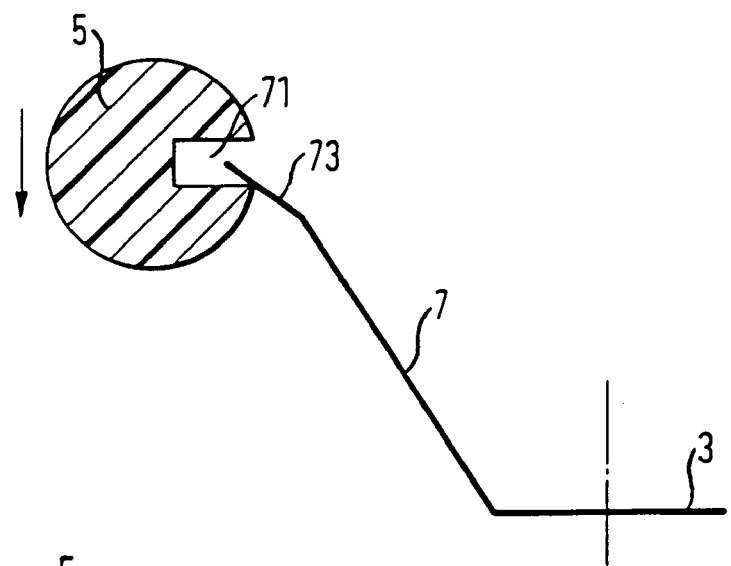
FIGS. 7 and 8 show diagrammatic illustrations of various phases of installation of the steering wheel according to the invention.
Figure 8:
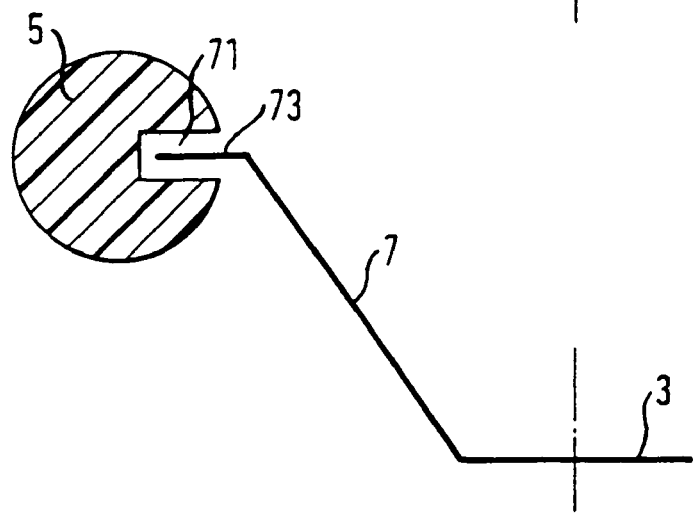

In the embodiment according to FIGS. 7 and 8, the skeleton section of hub 3 and spokes 7 consists of sheet metal. The steering wheel rim 5 has a receiving shell, not illustrated in further detail, which is characterized by an opening 71. At the start of installation (FIG. 7), the upper end 73 of the spoke 7 stands obliquely outwards and upwards, so that it does not project, or only projects slightly, into the opening 71. Through axial displacement of the steering wheel rim 5 in the arrow direction, with a simultaneous holding of the hub 3, the spokes 7 are pressed downwards and are deformed plastically, the radially outer upper end 73 likewise being bent and travelling outwards into the opening 71. FIG. 8 then shows the finished joined state. In this state, for example, the sheet metal skeleton of the spokes 7 can be encased in foam.

Figure 9:
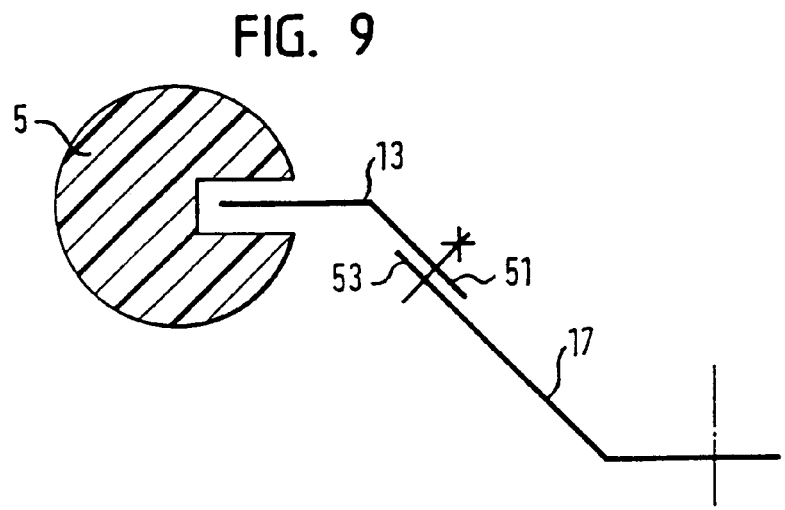
FIG. 9 shows a sectional view through a sixth embodiment of the steering wheel according to the invention.

In the embodiment according to FIG. 9, this is achieved for example in that the spoke sections 13, 17 each have fastening flanges 51, 53 which overlap each other. In the region of the fastening flanges 51, 53, the spoke sections 13, 17 are screwed with each other. The spoke section 13 is inserted into a receiving shell, not illustrated here in further detail, in the steering wheel rim 5.

Figure 10:
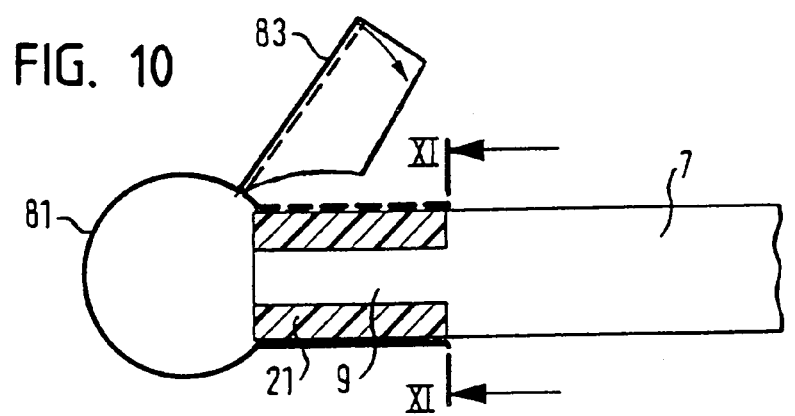
FIG. 10 shows a sectional view in the region of the transition point of the spoke to the steering wheel rim according to a seventh embodiment and FIG. 11 shows a cross-sectional view along the line XI—XI in FIG. 10.
Figure 11:
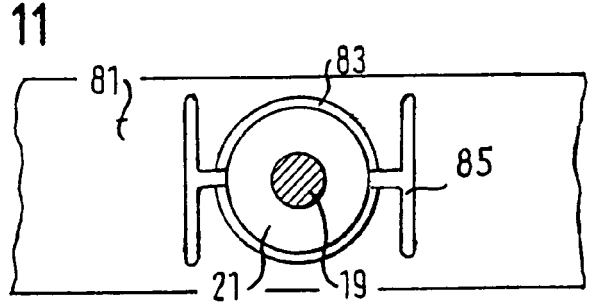

In the embodiment according to FIGS. 10 and 11, the steering wheel rim has a skeleton ring 81 of sheet metal having two opposing radially inwardly protruding projections. The upper projection 83 of the skeleton ring 81 is bent upwards before the start of assembling the steering wheel, as shown in FIG. 10. Thereby, the hub together with the spokes 7, the pins 19 and the elastic bearings 21 placed onto the pins 19 can be inserted into the skeleton ring 81. Then the upper projection 83 is bent downwards in the arrow direction and presses onto the bearing 21, so that the latter, as shown in FIG. 11, engaged by the projections and attached to the skeleton ring 81. A slit 85 is arranged between the projection 83 and the skeleton ring 81.

The invention claimed is:

1. A vehicle steering wheel, comprising:
  a hub,
  a steering wheel rim arranged radially distanced from said hub, and
  at least one spoke having at least one spoke section,
  said steering wheel rim and said spoke comprising a structure,
  said structure having inner and outer parts completely spaced apart such that said inner and outer parts do not directly contact each other, and
  a vibration-decoupling means for isolating vibration and bridging a distance between said inner and outer parts, so that forces from one of said inner and outer parts are transmitted to the other one of said inner and outer parts via only said vibration-decoupling means, said vibration-decoupling means acting in all directions and isolating said steering wheel rim vibrations from said at least one section of said spoke, said inner and outer parts being connected to each other by only said vibration-decoupling means and being otherwise completely disconnected, wherein said vibration-decoupling means is provided at a transition point of said spoke to said steering wheel rim.

2. A vehicle steering wheel, comprising:
  a hub,
  a steering wheel rim arranged radially distanced from said hub, and
  at least one spoke having at least one spoke section,
  said steering wheel rim and said spoke comprising a structure,
  said structure having inner and outer parts completely spaced apart such that said inner and outer parts do not directly contact each other, and
  a vibration-decoupling means for isolating vibration and bridging a distance between said inner and outer parts, so that forces from one of said inner and outer parts are transmitted to the other one of said inner and outer parts via only said vibration-decoupling means, said vibration-decoupling means acting in all directions and isolating said steering wheel rim vibrations from said at least one section of said spoke, said inner and outer parts being connected to each other by only said vibration-decoupling means and being otherwise completely disconnected, wherein said vibration-decoupling means is provided inside said spoke and separates spoke sections from each other in terms of vibrations.

3. The vehicle steering wheel according to claim 1, wherein spoke sections of said spoke have fastening flanges which overlap each other.

4. The vehicle steering wheel according to claim 1, wherein said spoke is defined by two separate spoke sections which are connected with each other by a bearing which surrounds said spoke sections and defines said vibration-decoupling means.

5. The vehicle steering wheel according to claim 1, wherein said steering wheel rim has a skeleton ring with radially inwardly protruding projections of sheet metal which projections are bent such that they engage an end of said spoke facing said skeleton ring.

6. A vehicle steering wheel, comprising:
a hub,
a steering wheel rim, and
at least one spoke having at least one spoke section,
a skeleton for said steering wheel rim and said spoke,
said skeleton being interrupted in a region between said spoke section and said steering wheel rim to define two separate skeleton parts, and
a vibration-decoupling means attaching said skeleton parts to each other, said vibration-decoupling means acting in all directions and at least largely isolating said steering wheel rim in terms of vibrations from said at least one section of said spoke,
said vibration-decoupling means being formed by a bearing,
said bearing comprising a pin, a receiving shell for said pin and an elastic equalizing element between said receiving shell and said pin,
said steering wheel rim having a skeleton ring and wherein one of said pin and said receiving shell is fastened to said skeleton ring, said spoke comprising said receiving shell and said pin, respectively.

7. A vehicle steering wheel, comprising:
a hub,
a steering wheel rim arranged radially distanced from said hub, and
at least one spoke having at least one spoke section,
a skeleton for said steering wheel rim and said spoke,
said skeleton being interrupted in a radial direction between said spoke section and said steering wheel rim to define radial inner and radial outer skeleton parts separated and distanced from each other so that immediate force transmission in a radial direction between said radial inner and radial outer skeleton parts is interrupted, and
a vibration-decoupling means bridging a distance between said skeleton parts and attaching said skeleton parts to each other, so that forces from one skeleton part are transmitted to the other skeleton part via said vibration-decoupling means, said vibration-decoupling means acting in all directions and isolating said steering wheel rim in terms of vibrations from said at least one section of said spoke, wherein said vibration-decoupling means is formed by a bearing, wherein said bearing comprises a pin, a receiving shell for said pin and an elastic equalizing element between said receiving shell and said pin.

8. The vehicle steering wheel according to claim 1 wherein said vibration-decoupling means is elastic.

9. The vehicle steering wheel according to claim 1 wherein said inner and outer parts are not integrally formed with each other.

10. The vehicle steering wheel according to claim 2, wherein spoke sections of said spoke have fastening flanges which overlap each other.

11. The vehicle steering wheel according to claim 2, wherein said spoke is defined by two separate spoke sections which are connected with each other by a bearing which surrounds said spoke sections and defines said vibration-decoupling means.

12. The vehicle steering wheel according to claim 2, wherein said steering wheel rim has a skeleton ring with radially inwardly protruding projections of sheet metal which projections are bent such that they engage an end of said spoke facing said skeleton ring.

13. The vehicle steering wheel according to claim 2 wherein said vibration-decoupling means is elastic.

14. The vehicle steering wheel according to claim 2 wherein said inner and outer parts are not integrally formed with each other.

* * * * *